United States Patent [19]

Herman

[11] 4,006,529
[45] Feb. 8, 1977

[54] CHECK GAGE FOR ARTICLE THICKNESS

[76] Inventor: Martin A. Herman, 2085 West 114th St., Cleveland, Ohio 44102

[22] Filed: Sept. 8, 1975

[21] Appl. No.: 611,340

[52] U.S. Cl. .......................... 33/174 L; 33/174 PA
[51] Int. Cl.² ....................................... G01B 3/00
[58] Field of Search ......... 33/174 L, 172 R, 172 B, 33/147 E, 148 R, 174 PA, 174 P, 174 PB, 174 E

[56] References Cited

UNITED STATES PATENTS

| | | | |
|---|---|---|---|
| 1,319,361 | 10/1919 | Rouanet | 33/174 L |
| 2,751,720 | 6/1956 | Foster | 33/172 R X |
| 2,763,934 | 9/1956 | Creek | 33/174 L |
| 2,839,836 | 6/1958 | Fuller | 33/174 PA |
| 3,080,659 | 3/1963 | Walford | 33/174 L |
| 3,762,056 | 10/1973 | Wolfe | 33/174 PA |
| 3,869,800 | 3/1975 | Bartlett | 33/174 L |

Primary Examiner—Richard E. Aegerter
Assistant Examiner—John W. Shepperd
Attorney, Agent, or Firm—Oldham & Oldham Co.

[57] ABSTRACT

A gage including a base having a reference surface with a bore extending into the base usually perpendicular to such surface, a gage unit on the base and including a cylindrical barrel section positioned in the bore, a slidable member in the barrel section with an article locater device operably carried thereon. The slidable member operably positions a gage member thereon in opposed spaced relationship to the article locater device.

13 Claims, 11 Drawing Figures

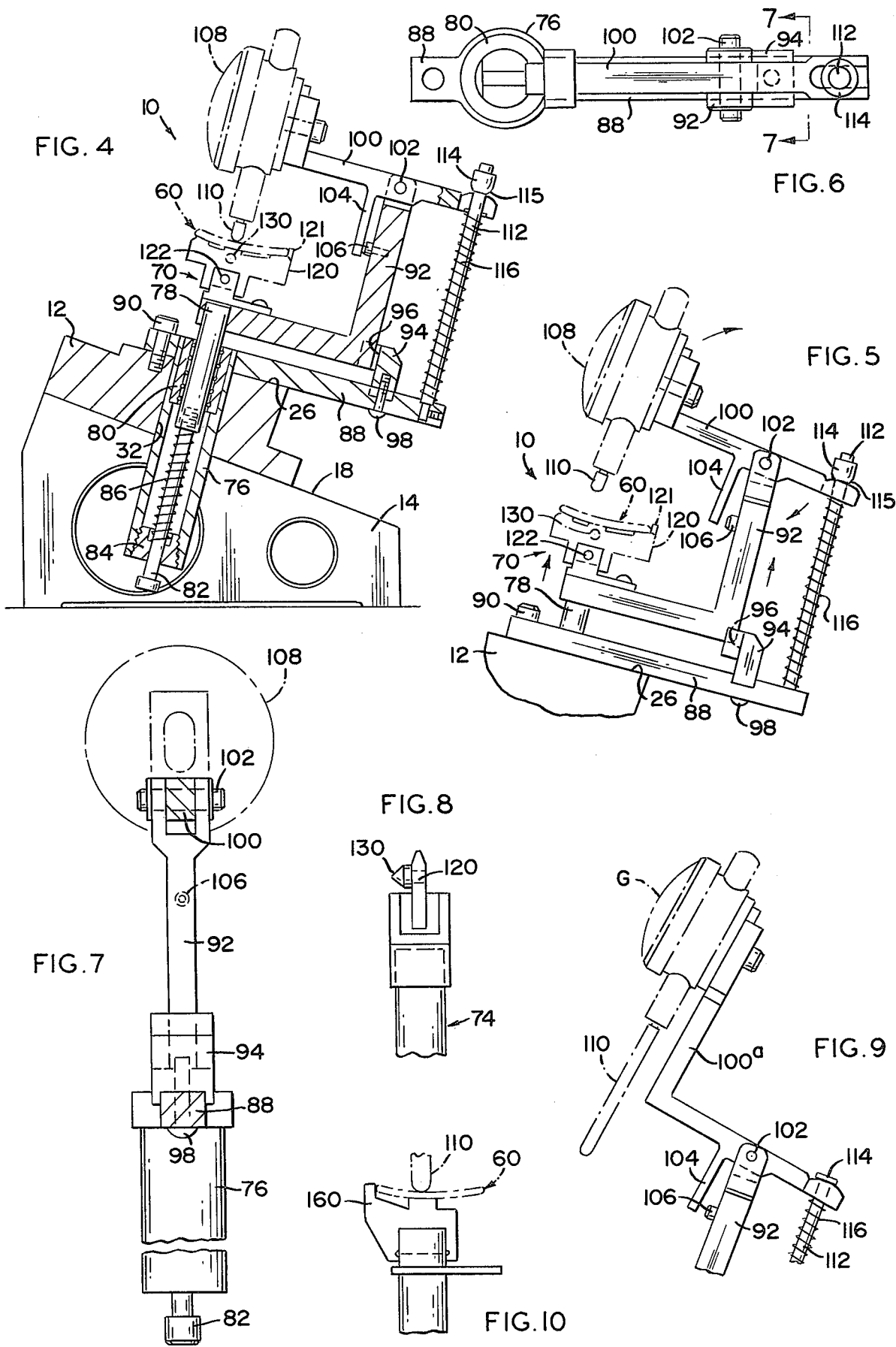

CHECK GAGE FOR ARTICLE THICKNESS

BACKGROUND OF THE INVENTION

Heretofore, there have been many different types of gages provided. Many of these gages are special purpose gages, and it is a difficult, lengthy and costly operation to produce almost all gages as used commercially today. Because of the accuracy and durability required in gages, they are quite expensive, so if it is possible to provide reusable portions in gages and to adapt the gages for accurately measuring any of a number of test articles, it obviously would be desirable. Hence, gages with independent or removable gage carrying means therein for replacement action to adapt the gage for use with any of a variety of products would be a quite desirable type of gage.

The general object of the present invention is to provide a novel and improved gage for measuring the thickness of test articles, and especially to a gage including a gage block therein wherein gage positioning units can be removably positioned in bores provided in the gage block to adapt the gage for use with different articles and gage means.

Another object of the invention is to provide a gage including a support base to carry a pair of article positioning devices thereon, and which gage base also operatively positions a plurality of gage means thereon, and with the gage means being automatically moved to inoperable positions to open the gage when a test article or specimen positioned in the gage is removed therefrom and to close the gage by an article positioned therein, so as to facilitate rapid loading, article testing, unloading, and reuse of the gage.

Another object of the invention is to position a plurality of gage units in a gage and wherein article locater devices are provided on each of the gage units in opposed spaced relationship to a particular gage device provided on the gage.

Other objects of the invention are to provide removable gage units that are positioned in a gage base by being received in bores formed in the gage base; to position a gage base in elevated relation to a support surface; to form a gage base particularly adapted to receive replaceable gage support members therein and adapted to permit adjustment of the support or resistance forces set up in the gage units from the lower end of the gage unit exposed in the gage support member; to provide a gage for rapid gaging action; and to form a gage that can use a variety of known gage members therein.

The foregoing and other objects and advantages of the invention will be made more apparent as the specification proceeds.

Reference now is made to the accompanying drawings, wherein:

FIG. 4 is a vertical section through a gage unit such as on line 4—4 of FIG. 1;

FIG. 5 is a fragmentary end elevation of the gage unit of FIG. 4 in its open form;

FIG. 6 is a plan view of the gage support unit of FIG. 5 with the gage thereon removed;

FIG. 7 is a vertical section taken on line 7—7 of FIG. 6;

FIG. 8 is a fragmentary enlarged side elevation of a gage locater support portion of the gage of FIG. 4;

FIG. 9 is a fragmentary side elevation of a modified type of the gage support unit shown in FIG. 5; and, FIG. 10 is a fragmentary elevation of another type of an article locater plate and its support means.

When referring to corresponding members shown in the drawings and referred to in the specification, corresponding numerals are used to facilitate comparison therebetween.

SUBJECT MATTER OF INVENTION

Figure 1:
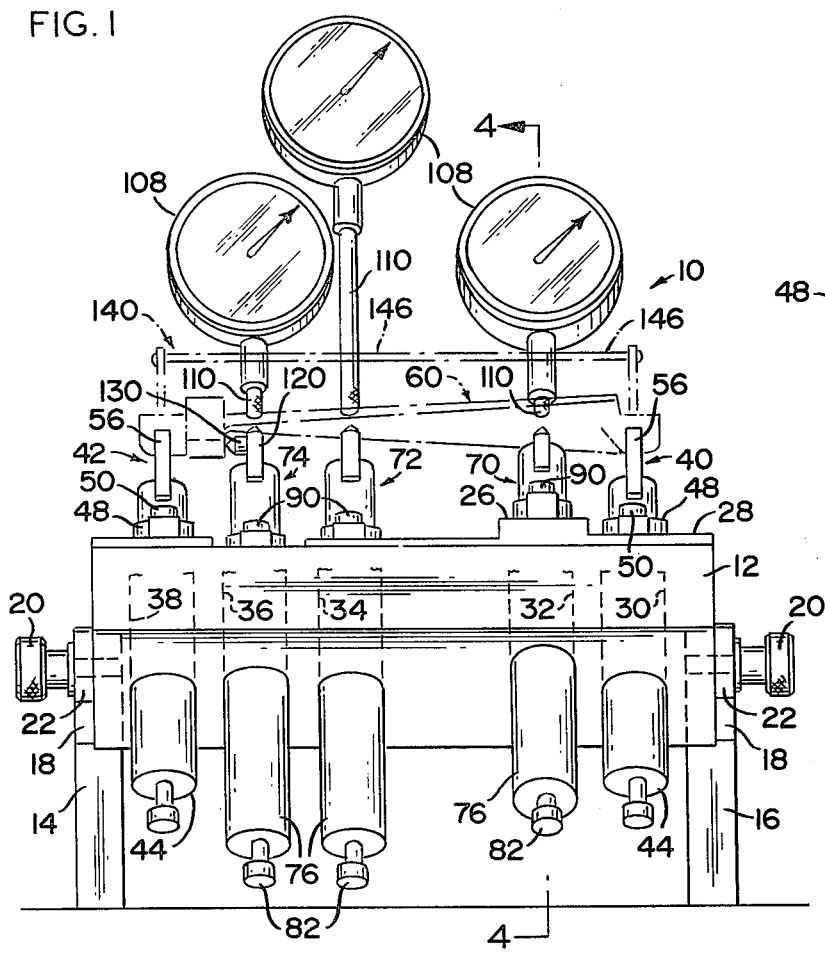
FIG. 1 is a front elevation of the gage of the invention with an article being illustrated positioned within the gage.

The gage of the invention, as one embodiment thereof, comprises a base means having an upper surface usually having a plurality of flat reference surfaces formed thereon which may be in different angular relationship to the base, the base having bores formed therein usually in each of these reference surfaces and normal thereto, said bores extending through said base member, a gage support means including a barrel portion mounted in at least one of said bores, a pair of article positioner means mounted in a pair of said bores with all of such bores being in substantial alignment along said base, gage support means individually mounted in said barrel portion and movable longitudinally on the axis thereof, and article locater means carried by said gage support means which is adapted to mount a gage member in opposed relationship to the said article locater means.

Referring now to the details of the structure shown in the accompanying drawings, a gage is indicated as a whole by the numeral 10. This gage includes a base 12 that is supported by a pair of base or end plates 14 and 16. These base plates 14 and 16 usually have inclined flat support surfaces 18 formed thereon and the base 12 has a flat bottom surface supported on these surfaces 18. The base is shown secured to its support plates 14 and 16 as by knurled knob screw 20 that extend through projecting flanges 22 formed on the plates 14 and 16 and secured to ends of the base by the knurled screws engaging tapped bores formed in opposed ends of the base 12. The base can engage its support means in any suitable manner.

Obviously the base 12 can have any desired number and/or types of reference points or surfaces provided thereon, and the drawings show that a flat surface 26 is provided on the upper end of the base 12 and that other flat surfaces 28 may be formed in different angular relationships to the flat bottom surface of the base.

It is an important feature of the invention that a plurality of bores 30, 32, 34 36 and 38 are formed in the base 12 and extend therethrough. These bores are of uniform diameters and are used for positioning removable article positioner means or gage means in the gage of the invention. Usually these bores would be perpendicular to flat surfaces provided on the upper or top portion of the base 12 and with such surfaces in some instances being positioned in different angular relationships to the horizontal. The article locater or positioner means and gage carrying means are removably positioned in the bores 30 through 38 to permit the gage of the invention to be versatile for use with any of a number of different gage support members. Obviously, if desired, only one or no reference surface need be provided on the upper portion of the base 12, and all of the bores in the base can be parallel, if desired.

Figure 3:
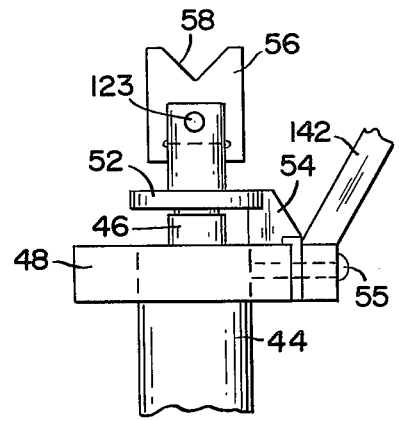
FIG. 3 is an enlarged fragmentary detailed elevation of an article locater means positioned in the gage of FIG. 1.
Figure 3A:
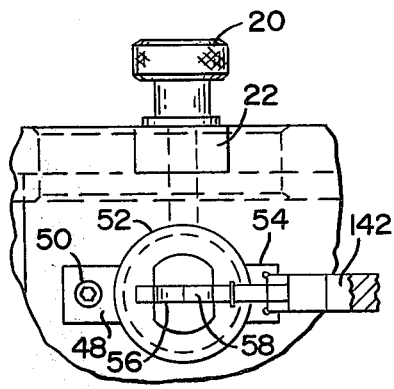
FIG. 3A is a fragmentary plan view of one end portion of the gage of FIG. 1.

Article positioner means 40 and 42 are shown removably positioned in engagement with the end bores 30 and 38 formed in the base. Each of these includes a positioning cylinder or barrel 44 in which a support pin 46 is slidably positioned for movement only on the axis of the barrel 44 in a manner as described hereinafter in more detail. The barrels 44 have a support collar 48, usually formed integrally with the barrel, provided thereon and seating against an associated flat top surface of the base and secured thereto as by a cap screw 50. The pin 46 in turn protrudes upwardly from the support collar 48 and it has an alignment disc 52 secured thereto or formed integrally therewith and positioned perpendicular to the longitudinal axis of the pin 46. When testing an article, it is manually engaged with the means 40 and 42 and pressed downwardly thereinto to seat the discs 52 on the top of the collar or flange 48. The disc has a slot or recess formed in a peripheral portion thereof and it slidably and accurately receives a flat locater plate 54 in such slot so that the pin 46 is retained against rotation in the barrel 44 and will only move axially thereof. The plate 54 is secured to the collar 48 by a screw 55 to extend vertically upwardly from such collar. Spring means move the pins 46 up to the release position shown in FIG. 3.

The pin 46 is diametrically slotted at its upper end to engage and accurately position a member such as a locator block 56 having a V-shaped upper surface 58. Thus, when a test article, indicated at 60, is formed, normally it has a tang or projection 62 on its lower end with such tang or projection being received in and accurately positioned by the V-notch 48. The test article is properly aligned and positioned in the gage by engaging the pair of the spaced article positioner and locater means 40 and 42 provided in the gage.

The actual gaging action in the gage means of the invention is provided by one or more gage support units indicated as a whole by the numerals 70, 72 and 74 in the drawings. All of these gage units 70, 72 and 74 include barrels 76 like the barrel 44 and positioner pins 78 similar to the pins 46. The details of the positioning of these pins 78 and 46 is best shown in FIG. 4 which shows that an inner bearing positioning sleeve 80 is received in each of the barrels 76 to position the pins and the bearings provided in this bearing carrying sleeve 80 are axially aligned with each other in a plurality of peripherally spaced portions of the sleeve so that the pins 78 are positioned for substantially only axial movement in the barrels.

The position of the pins 78 in the individual barrels 76 is longitudinally adjustable by the provision of a control cap screw 82 that slidably and rotatably extends through a plug 84 secured in the lower end of each of the barrels 76 and being in threaded engagement with a tapped bore provided in the lower end of the pin 78. A coil spring 86 is compressed between the plug 84 and the lower end of the pin 78 to urge it upwardly at all times, but to permit limited vertical movement of the pin in its barrel for article engaging and gage action.

The individual gage units are removably secured to the base 12, as by a positioning and support arm 88 suitably attached to the upper end of the individual barrel 76 and secured to the base as by a cap screw 90. These positioning and support arms 88 engage and extend along the adjacent surface 26 or equivalent on the upper portion of the base and normally extend from the base a short distance.

The actual gage positioning means for the individual gage units include a substantially L-shaped positioning bracket 92 that is fixedly suitably secured to the upper end of the pin 78. This bracket aids in positioning the pin 78 for only longitudinal movement on the axis of the barrel 76 by a member, such as a bracket or guide 94, secured to this positioning arm 88. This guide 94 has a vertically extending slot 96 formed in an offset portion thereof in which a portion of the bracket 90 is slidably received for only sliding movement in the gage parallel to the axis of the pin 78.

The guide 94 is secured to the positioning arm 88 by a cap screw 98. Such positioning arm or bracket 92 has a gage support arm 100 pivotally secured to its upper end, as by a pin 102 and the gage support arm normally has a stop bar or flange 104 extending therefrom and engaging a stop pin 106 adjustably carried by the bracket 92 whereby pivotal movement of the gage support arm 100 is one direction can be accurately limited. The drawing shows that any desired type of a gage means or member indicated by the numeral 108 is conventionally attached to one end of this gage support arm 100. Such gage means may, for example, have a gage plunger 110 movably extending therefrom for contact with the test article positioned on the locater member positioned in the lower parts of the gage.

The end of the gage support arm 100 extending from the pin 102 in the opposite direction engages a limiter pin 112 secured in removable engagement with the positioning arm 88 to extend, usually, perpendicularly therefrom. Such pin 112 has a head adjustably secured thereon that engages the upper surface of the gage support arm 100. To urge the gage member 108 towards its operative position when the bracket 92 is moved to gaging position, FIG. 4, a coil spring 116 is in compressive engagement at that time between the adjacent surfaces of the gage support arm 100 and the positioning arm 88. However, by positioning the entire gage support means for limited vertical movement with relation to the base of the gage, a radiused lower surface 115 of the head 114 of the pin 112 will provide a release or opening action of the gage when the entire L-shaped support bracket 92 is permitted to move up from the depressed operative gaging position shown in FIG. 4 up to the open position as shown by FIG. 5. The vertical opening movement is provided by the spring 86 moving the pin 78 and the means carried thereon relative to the axis of the barrel 76. Additionally, normally the test article 60 is manually positioned in the gage 10 of the invention, manually held therein, and then promptly removed therefrom after the gaging action has been obtained. Such action, controlled by the positioner means 40 and 42 also engages the work piece with the gage support units 70, 72 and 74 and automatically moves them to closed gaging or to open positions.

A typical article gage device or locater is indicated at 120 and it may comprise a tangent rail maximum contour locater of any known type that is carried by the pin or rod 78 at its upper end. Normally the upper end of this pin or rod 78 has a diametrically extending slot therein for receiving this contour gage or locater gage member 120 therein. The form of such locater varies with the individual articles being tested and the thickness or other measurement of the article that is being taken. Such locater is accurately positioned on the center line of the pin or rod 78 by a set screw 122 engaging a threaded bore in the upper emd of the pin 78 and extending through the wall thereof to engage and seat in a recess provided in the locater or gage plate operatively positioned on this particular gage unit. A similar set screw 123 aids in centering the locater block 56.

FIG. 9 of the drawings shows that the gage support arm as shown in FIG. 4 can be modified to comprise a gage support arm 100a that positions the actual gage means indicated at G in different vertical relationship to the other gage means or indicators provided in the apparatus so that these gage members or dials do not interfere with each other.

Naturally, it should be understood that any suitable type of gage means can be positioned by the L-shaped bracket support arms 92, electronic probes being one indication of other gas means that can be used.

Normally, the various gage support members in the apparatus would be positioned intermediate the two article locater means 40 and 42 that are received in the end portions of the base of the gage. The remaining gage members are in general alignment with each other for providing the gage means vertically above and opposed to the article locater means positioned on the lower portion of the gage support members as shown in FIG. 4. The indicator gage means are positioned spaced from the individual locater means when the gage means are open, as shown in FIG. 5, to facilitate rapidly placing articles in the gage 10 for checking.

Obviously, these gages, plates or locater means 120 can have centering pins 130 or other equivalent means provided thereon all is well known in the gage art.

Adjustment of the control screw 82 can vary the released position of the individual gage support arms 92 operatively positioned in each of the gage support units of the invention. Thus the released positions of the locater members or devices as positioned in the individual gage positioning units can be varied and controlled, as desired.

Figure 2:
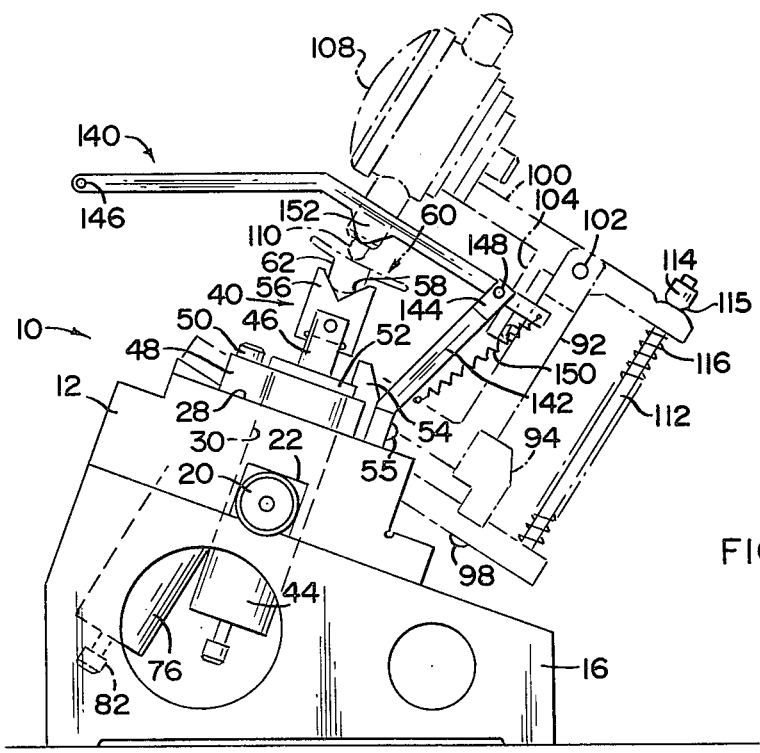
FIG. 2 is a right side elevation of the gage of FIG. 1, with the article and gage member indicated diagrammatically therein.

The gage may also include a test article clamping device indicated as a whole by the numeral 140 and shown in FIGS. 1 and 2. The clamping means 140 include a pair of support arms 142 that are secured to the collar 48 by the set screw 55 and which arms extend upwardly and rearwardly of the gage and terminate in bifurcated upper ends 144. A substantially U-shaped unit or clamp control 146 has two arms that pivotally engage the upper ends of these arms 144 and extends forwardly therefrom to be available at and extend across the front portion of the gage. This clamp control means 146, at the rear ends thereof, protrudes slightly from pins 148 by which the clamp means 146 engages the arms 142. Control springs 150 engage the rear ends of these arms of the member 146 and extend downwardly to be attached at their lower ends to a lower portion of each of the arms 142. The relationship of the springs and arms of the member 146 is such that the clamp means usually will retain an elevated release position and be manually movable to a lowered operative position wherein protruding lugs 152 on this control means 146 press the article to be tested firmly against the V-shaped locater blocks carried in the gage members 40 and 42.

This clamp means 140 need not be used in all locater of the invention, and the article can be located just by use of the members 40 and 42. However, it is also possible to dispense with the gage members 40 and 42 and the locater blocks positioned thereby when the locater means positioned on the remaining gage elements, such as the members 70, 72, and 74, are adapted to receive and accurately position a test article therein. For example, any locater means can be positioned on these gage members 70, 72, and 74, and, for example, the locater 120 may have an edge flange 121 thereon to make such locater be a leading edge stop and locater for engaging one edge of the test article whereby the test article is accurately centered and positioned in the gage by engaging a plurality of these locater members 120 or the equivalent. Thus, a leading edge stop can be provided on several of the locater members 120 to position the center line or stacking axis of the part accurately in the gage. The locater means may also include tangent rails or tip section locaters as is well known in the art, and which members could be carried by the gage means 70 through 74 to engage and position a test article. A modified locater plate 160 is shown in FIG. 10. The clamp member 140 in FIG. 2 has not been moved to its full operative position.

When the locater gage members 40 and 42 are omitted, then the positions of the remaining gage members must be accurately set before engaging a test article therewith. For example, in setting the gage, the support pins 78 or brackets 92, or means operatively associated therewith can be blocked against extensive downward movement and only be permitted a short distance of movement and in using the gage the end gage members 76 are blocked the same as when the gage is set. Then the indicator gages such as the gage 108 can be set by positioning any known means such as a set master, gage blocks, or the like, on the locater means 120 and then having the gage plunger 110 brought into contact with the spacer blocks and be set to zero or other required gaging thickness whereby any deviation of a test article from the standard predetermined by the gage setting means will be accurately reflected on the indicator dials of the gages. When members 40 and 42 are used, the discs 52 are bottomed on the collars 48 and the gage members are then adjusted for proper gaging action.

In positioning the gage base of the invention on the support plates 14 and 16, any suitable positioning members can be used. Preferably the gage's base is positioned at an angle to facilitate reading of the gage members.

It should be observed that the locater means 120 can be any known or required means for engaging a test article so that it is positioned or nested in the locaters in an accurate manner for gaging action.

It further should be understood that the gaging action and the gage means of the invention are so set up as to limit downward movement of the gaging cylinders, such as the cylinders 70 through 74, as by the support arms 92 bearing on the base, so that the gage means and gage plunger can be adjusted to measure the test article accurately in relation to the article stacking axis or datum plane of the test part, or any known reference axis point or line on the test specimen.

From the foregoing, it will be seen that a gage means has been provided that includes a gage base or block 12 that can have any suitable support means provided therefor, which means usually comprise a pair of end plates so that members positioned on the gage base 12 can extend therethrough and be exposed for adjustment of the position of the actual gage carrying members forming a part of the individual gage units that are removably positioned in the gage. Inasmuch as all of the barrels 76 in the gage are of uniform size and with individual gage means being operatively positioned by these barrel portions of each support unit, it will be realized that the actual gage members and gage indicators or dial members associated with the individual gage means in the apparatus can be varied widely dependent upon the particular types of articles being checked. Normally the gage of the invention is particularly designed for checking the thickness of a test specimen. Thus, it is believed that a practical, sturdy and automatic type of a gage has been provided since the gage means as represented by the L-shaped brackets 92 carrying the individual gage members will automatically be opened when the workman lifts a test article upwardly out of the gage. Hence, the gage is automatically set for ready receipt of the next test article as manually inserted into the gage and pressed downwardly against the article positioning means represented by the means 40 and 42 shown in the drawings. Obviously, the test article can engage with these article positioning means 40 and 42 in any suitable manner to force them down against the release action of the springs 86 present in all gage or positioning units to seat the discs 52 on the support surface to position the article in the gage for test action. Thus, it is believed that the objects of the invention have been achieved.

While one complete embodiment of the invention has been disclosed herein, it will be appreciated that modification of this particular embodiment of the invention may be resorted to without departing from the scope of the invention.

What is claimed is:

1. A gaging apparatus comprising
a support means including a base having a plurality of longitudinally spaced bores therein,
a pair of test article positioner means carried by said base in individual ones of said bores and having an axially movable section operatively protruding upwardly therefrom, an article engaging member operatively positioned on each of said sections, and means to limit axial movement of said sections toward said base to seat against said base to prepare the gage for article test action,
a gage support means including a cylindrical carrier section positioned in at least one of said bores and on a substantially vertical axis, a positioner pin in said carrier and axially movable therein and an article locater device operatively carried by said pin for movement on the axis thereof, a vertical support bracket carried by said pin, a gage support arm pivotally carried by said vertical support bracket for movement to an inoperative position and a gage means positioned on said gage support arm above and opposed to said article locater device, and
means securing said gage support means to said base, said gage support means being positioned between said pair of article positioner means, a test article being engaged by said article engaging members and by said article locater device.

2. A gage as in claim 1 wherein said gage support means has means to limit the axially movement of said positioner pins spring means in each said carrier section urging said positioner pins upwardly, said support bracket being L-shaped and each bracket having a vertically extending leg, one of said gage means being operably positioned on the upper end of each of said vertical legs of said support brackets by said gage support arm, and a said article locater device is operatively carried by the upper end of each of said positioner pins, said gage support arms pivotally engaging said vertical legs, means to move ends of said gage support arm upwardly to move said gage means to inoperative positions on movement of said positioner pins upwardly as far as possible by said spring means.

3. A gaging apparatus as in claim 1 where interengageable stop means are operatively carried by said one end of each of said gage support arms and said vertically extending legs of said support brackets to limit movement of said gage support arms towards said article locater device, and limit means operatively extend between said base and the other end of each of said gage support arms to limit upward movement of said other end of said support arms to open the gaging apparatus by moving said gage means away from said article locater devices with upward vertical movement of said positioner pins and members thereon.

4. A gage as in claim 1 and where a U-shaped clamp arm including a front bar is pivotally secured to a rear portion of said base and extends depthwise thereof to a front portion of said base, which arm has sections to engage a test article on said article positioner means and force the article towards said base on downward movement of said clamp arm by said front bar.

5. A gage as in claim 1 where said article positioner means each include cylindrical portions having a support member resiliently positioned therein for only axial movement in such cylindrical portion, said support member being urged upwardly away from said cylindrical portions at all times and a stop member carried by each said support member to limit axial movement thereof inwardly of said cylindrical portions.

6. A gaging apparatus comprising
a base having top and bottom surfaces and having a plurality of bores formed therein extending substantially vertically through said base,
a plurality of gage support means each including a barrel individually mounted in different ones of said bores,
said gage support means each including a positioner pin in said barrel portion and protruding upwardly from said top surface of said base, said positioner pin being axially movable in said barrel, spring means urging said positioner pin upwardly, a plurality of L-shaped support brackets each having a substantially vertically extending leg, one of said support brackets being secured to the upper end of each of said pins and being movable with such pins, an article locater device operatively carried by the upper end of each of said positioner pins to receive and position a test article, and gage support arms, a center portion of individual gage support arms pivotally engaging the upper end of each of said vertically extending legs of said support brackets, individual gage means carried by each of said support arms at one end thereof and extending downwardly therefrom, each of said gage means being positioned above and opposed to one of said article locater devices, and limit means operatively extends between said base and the other end of each of said gage support arms to limit upward movement of said other end of said support arms to open the gaging apparatus with upward vertical movement of said positioner pins and members thereon.

7. A gaging apparatus as in claim 6 where interengageable stop means are operatively carried by said one end of each of said gage support arms and said vertically extending legs of said support brackets to limit closing movement of said gage support arms.

8. A gaging apparatus as in claim 7 where a pair of article positioner means are provided in bores in spaced portions of said base, test article locater members carried by said article positioner means and movable towards said base, and limiter means are operatively connected said positioner means to limit movement of said article locater members towards said base for test article positioning action.

9. A gaging apparatus as in claim 6 wherein said gage support means each include a cylindrical barrel received in one of said bores and with all of said bores being of uniform diameter, said gage support means being removably carried by said base whereby they can be changed for gage action on different articles.

10. A gage as in claim 6 and where a U-shaped clamp arm is pivotally secured to a rear portion of said base and extends depthwise thereof to a front portion of said base, which clamp arm has sections to engage a test article on and extending between said article positioner means and force the article and said sections towards said base for said sections to bottom in relation to said base and position the test article for gaging action.

11. A gaging apparatus comprising
a base having top and bottom surfaces and having a plurality of bores formed therein extending substantially vertically through said base,
a plurality of gage support means each including a barrel individually mounted in different ones of said bores,
said gage support means having sections protruding from both said top and bottom surfaces of said base, said gage support means each including a positioner pin in said barrel and protruding upwardly therefrom, said positioner pin being axially movable in said barrel, spring means urging said positioner pin upwardly, a plurality of L-shaped support brackets each having a substantially vertically extending leg, one of said support brackets being secured to the upper end of each of said pins and being movable with such pins, an article locater device operatively carried by the upper end of each of said positioner pins to receive and position a test article, securing means affixing said barrels to said base, guide means engaging said support brackets to permit movement thereof only parallel to the center axis of said barrels, and gage support arms a center portion of individual gage support arms pivotally engaging the upper end of each of said vertically extending legs of said support brackets, individual gage means carried by each of said support arms at one end thereof for individually engaging a test article on said article locater devices, and limit means operatively extends between said base and the other end of each of said gage support arms to limit upward movement of said other end of said support arms to open the gaging apparatus with upward vertical movement of said positioner pins and members thereon.

12. A gage as in claim 11 and where a U-shaped clamp arm is pivotally secured to a rear portion of said base and extends depthwise thereof to a front portion of said base, which clamp arm has sections to engage a test article on and extending between said article locater devices to force the article and said sections towards said base for said sections to bottom in relation to said base and position the test article for gaging action, spring means urging said clamp arm to an upper released position, and said limit means including a spring member operatively engaging said gage means to urge it to a closed position.

13. A gaging apparatus as in claim 11,
a pair of article positioner means carried by said base in a pair of said bores and each having a section operatively protruding upwardly therefrom for movement axially of such means, an article locater member operatively positioned on the upper ends of each of said sections for movement axially of said article positioner means, and stop means for operatively engaging said section to limit axial movement thereto towards said base whereby placing an elongated test article on said article positioner means to extend therebetween and forcing the article towards said base engages said stop means with said base and portions said article for gaging action, said pair of bores being formed in said base in relation to the remainder of said bores so as to engage all of said article locater devices with the test article.

* * * * *

UNITED STATES PATENT OFFICE
CERTIFICATE OF CORRECTION

PATENT NO. : 4,006,529
DATED : February 8, 1977
INVENTOR(S) : Martin A. Herman

It is certified that error appears in the above-identified patent and that said Letters Patent are hereby corrected as shown below:

Column 2, line 46, "screw" should be --screws--

Column 5, line 5, "emd" should be --end--

Column 6, line 1, remove "locater" and insert --embodiments--

Claim 8, line 15, after "connected", insert --to--

Signed and Sealed this

Twelfth Day of April 1977

[SEAL]

Attest:

RUTH C. MASON
Attesting Officer

C. MARSHALL DANN
Commissioner of Patents and Trademarks